US011125200B2

(12) United States Patent
Bang et al.

(10) Patent No.: US 11,125,200 B2
(45) Date of Patent: Sep. 21, 2021

(54) CONTROL METHOD FOR SSC AND ISG OF VEHICLE AND VEHICLE TO WHICH THE CONTROL METHOD IS APPLIED

(71) Applicants: HYUNDAI MOTOR COMPANY, Seoul (KR); KIA MOTORS CORPORATION, Seoul (KR)

(72) Inventors: Jung Hwan Bang, Seoul (KR); Jun Yong Lee, Gwangmyeong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/878,890

(22) Filed: May 20, 2020

(65) Prior Publication Data

US 2021/0088017 A1 Mar. 25, 2021

(30) Foreign Application Priority Data

Sep. 20, 2019 (KR) .......................... 10-2019-0116111

(51) Int. Cl.
*B60W 30/18* (2012.01)
*F02N 11/08* (2006.01)
(Continued)

(52) U.S. Cl.
CPC ......... *F02N 11/0833* (2013.01); *B60W 10/02* (2013.01); *B60W 10/06* (2013.01);
(Continued)

(58) Field of Classification Search
CPC ................. F02N 11/0833; F02N 11/04; F02N 2200/0801; F02N 2200/0802;
(Continued)

(56) References Cited

U.S. PATENT DOCUMENTS

2013/0116906 A1* 5/2013 Christen ............... B60W 10/10
701/93
2015/0011360 A1* 1/2015 Sano ............... B60W 30/18018
477/203

(Continued)

FOREIGN PATENT DOCUMENTS

KR 20170085223 A * 7/2017 ............ B60W 10/06

OTHER PUBLICATIONS

Machine translation KR20170085223A filed Apr. 8, 2021 (Year: 2021).*

*Primary Examiner* — Tisha D Lewis

(57) ABSTRACT

A control method for a Start Stop Coasting (SSC) function and an Stop and Go (ISG) function of a manual transmission vehicle includes: determining, by a controller, whether an SSC activation condition is satisfied based on vehicle running state information; stopping, by the controller, an engine and disengaging a clutch to activate the SSC function when the controller determines that the SSC activation condition is satisfied; determining, by the controller, whether a first ISG operation is satisfied based on the vehicle running state information in the state that the SSC function is activated; and deactivating, by the controller, the SSC function and activating the ISG function when the controller determines that the first ISG operation condition is satisfied.

19 Claims, 11 Drawing Sheets

(51) Int. Cl.
*B60W 10/02* (2006.01)
*B60W 10/11* (2012.01)
*F02D 41/30* (2006.01)
*B60W 10/08* (2006.01)
*F02N 11/04* (2006.01)
*B60W 10/06* (2006.01)

(52) U.S. Cl.
CPC ............ *B60W 10/08* (2013.01); *B60W 10/11* (2013.01); *B60W 30/18018* (2013.01); *B60W 30/18072* (2013.01); *F02D 41/3005* (2013.01); *F02N 11/04* (2013.01); *B60W 2520/10* (2013.01); *B60W 2540/10* (2013.01); *B60W 2540/12* (2013.01); *B60W 2540/14* (2013.01); *B60W 2540/16* (2013.01); *F02N 2200/0801* (2013.01); *F02N 2200/0802* (2013.01); *F02N 2200/101* (2013.01); *F02N 2200/102* (2013.01); *F02N 2200/103* (2013.01)

(58) Field of Classification Search
CPC ......... F02N 2200/101; F02N 2200/102; F02N 2200/103; F02D 41/3005; B60W 10/02; B60W 10/06; B60W 10/08; B60W 10/11; B60W 30/18018; B60W 30/18072; B60W 2520/10; B60W 2540/12; B60W 2540/14; B60W 2540/16
See application file for complete search history.

(56) References Cited

U.S. PATENT DOCUMENTS

| | | | | |
|---|---|---|---|---|
| 2015/0329119 | A1* | 11/2015 | Sujan | F02D 41/042 |
| | | | | 701/54 |
| 2017/0313316 | A1* | 11/2017 | Shiraishi | B60W 10/11 |
| 2020/0353928 | A1* | 11/2020 | Won | B60W 10/06 |
| 2021/0003107 | A1* | 1/2021 | Byun | B60K 6/52 |

* cited by examiner

CONTROL METHOD FOR SSC AND ISG OF VEHICLE AND VEHICLE TO WHICH THE CONTROL METHOD IS APPLIED

CROSS-REFERENCE TO RELATED APPLICATION

This application claims priority to and the benefit of Korean Patent Application No. 10-2019-0116111, filed on Sep. 20, 2019, the entire contents of which are incorporated herein by reference.

FIELD

The present disclosure relates to a control method for a Start Stop Coasting (SSC) function and an Idle Stop and Go (ISG) function, and a manual transmission vehicle of which the control method is applied.

BACKGROUND

The statements in this section merely provide background information related to the present disclosure and may not constitute prior art.

Efforts have been made worldwide to reduce carbon dioxide generated by combustion of a fuel in vehicles and to improve fuel efficiency of vehicles in accordance with an era of high oil prices.

An idle stop and go (ISG) system has been developed to meet these goals. It has been proven that the ISG system can reduce an amount of carbon dioxide generated in the vehicle and can improve fuel efficiency.

The ISG system is an engine control system that stops or turns off an engine of a vehicle to prevent the engine from operating when the vehicle decelerates or stops. The ISG system drives the engine again to enable the vehicle to move when the vehicle starts.

The ISG system uses information such as the vehicle speed, the engine speed, and the engine coolant temperature to stop the engine when the engine is idling. In other words, the ISG system automatically stops the idling engine when the vehicle decelerates or stops, such as at a traffic signal, and restarts the engine to start the vehicle after a predetermined time. The ISG system may also be expressed as an idling stop control device. The ISG system can improve fuel economy by about 5 to 15% in a fuel economy mode. A vehicle equipped with the ISG system is referred to as an ISG vehicle.

Because the ISG system prevents the engine from operating when the vehicle decelerates or stops, fuel is not used. Thus, the fuel efficiency of the vehicle can be improved and carbon dioxide is not discharged.

However, we have discovered that the currently applied ISG system operates at a vehicle speed of about 5 kph or less, so the fuel consumption effect is limited.

In addition, we have found that the vehicle may not enter the ISG (Idle Stop & Go) state when a clutch pedal is pressed while a transmission gear is engaged during deceleration of the vehicle.

The above information disclosed in this Background section is only for enhancement of understanding of the background of the present disclosure and therefore it may contain information that does not form the prior art that is already known to a person of ordinary skill in the art.

SUMMARY

The present disclosure provides a control method for an SSC function and an ISG function, in which a section for stopping an engine is expanded, and a manual transmission vehicle applied with the method.

In one form of the present disclosure, a control method for an SSC function and an ISG function of a manual transmission vehicle includes: determining, by a controller, whether an SSC activation condition is satisfied based on vehicle running state information; stopping, by the controller, an engine and disengaging a clutch to activate the SSC function when the controller determines that the SSC activation condition is satisfied; determining, by the controller, whether a first ISG operation condition including a first reference vehicle speed is satisfied based on the vehicle running state information in the state that the SSC function is activated; and deactivating, by the controller, the SSC function and activating the ISG function when the controller determines that the first ISG operation condition is satisfied.

The SSC activation condition may be satisfied when it is determined that an accelerator pedal is not operated, a brake pedal is not operated, a clutch pedal is not operated, the gear lever is in a traveling stage, and a vehicle speed is a predetermined SSC entry vehicle speed according to the vehicle running state information.

The predetermined SSC entry vehicle speed may be set differently according to the traveling stage of the gear lever.

The first ISG operation condition may be satisfied when it is determined that the accelerator pedal is not operated, the brake pedal is operated, the gear lever is in the traveling stage, the clutch pedal is in a fully depressed state, and the vehicle speed is lower than the first reference vehicle speed according to the vehicle running state information.

After the brake pedal is operated or the clutch pedal is fully depressed, when the first ISG operation condition is not satisfied within a predetermined time or a predetermined deceleration condition, the engine may be started.

In another form, the control method for the SSC function and the ISG function may further include: in a state that the SSC function is deactivated, determining, by the controller, whether a second ISG operation condition is satisfied, where the second ISG operation condition includes a second reference vehicle speed that is predetermined to be lower than the first reference vehicle speed according to the vehicle running state information.

The second ISG operation condition may be satisfied when it is determined that the accelerator pedal is not operated, the brake pedal is operated, the gear lever is in the traveling stage, the clutch pedal is in the fully depressed state, and the vehicle speed is lower than the second reference vehicle speed according to the vehicle running state information.

The first reference vehicle speed and the second reference vehicle speed may be set differently according to the traveling stage of the gear lever.

In another form, the control method for the SSC function and the ISG function may further include: determining, by the controller, whether an SSC function deactivation condition is satisfied based on the vehicle running state information when the first ISG operation condition is not satisfied.

The SSC function deactivation condition may be satisfied when the accelerator pedal is operated, the brake pedal is operated, the clutch pedal is operated, the gear lever is not in the traveling stage, or the vehicle speed corresponds to a predetermined SSC function deactivation vehicle speed according to the vehicle running state information.

In some forms of the present disclosure, a manual transmission vehicle implementing a control method for an SSC function and an ISG function includes: a vehicle operation status detector including an accelerator pedal sensor for sensing an operation of an accelerator pedal to output a corresponding signal, a brake pedal sensor for sensing an operation of a brake pedal to output a corresponding signal, a clutch pedal sensor for sensing an operation of a clutch pedal to output a corresponding signal, a gear lever sensor for sensing an operation of a gear lever to output a corresponding signal, and a vehicle speed sensor for sensing a vehicle speed to output a corresponding signal; an injector for injecting fuel to an engine; an operating motor connected to the engine to selectively start the engine; an electronic clutch selectively connecting a manual transmission and the engine; a controller controlling the operations of the injector, the operating motor, and the electronic clutch according to an output signal of the vehicle operation status detector; and a memory electrically connected with the controller. In particular, the controller determines whether an SSC activation condition is satisfied based on the output signal of the vehicle operation status detector, and when it is determined that the SSC activation condition is satisfied, the controller controls the operation of the injector to stop fuel injection and disengages the electronic clutch to activate the SSC function. In the state that the SSC function is activated, the controller determines whether a first ISG operation condition including a first reference vehicle speed is satisfied based on the vehicle running state information, and when the controller determines that the first ISG operation condition is satisfied, the SSC function is deactivated and the ISG function is activated.

The SSC activation condition may be satisfied when it is determined that an accelerator pedal is not operated, a brake pedal is not operated, a clutch pedal is not operated, a gear lever is in a traveling stage, and a vehicle speed is a predetermined SSC entry vehicle speed according to an output signal of the vehicle operation status detector.

The first ISG operation condition may be satisfied when it is determined that an accelerator pedal is not operated, a brake pedal is operated, a gear lever is in a traveling stage, a clutch pedal is in a fully depressed state, and a vehicle speed is lower than the first reference vehicle speed according to the output signal of the vehicle operation status detector.

After the operation of the brake pedal or the clutch pedal is fully depressed, and when the first ISG operation condition is not satisfied within a predetermined time or a predetermined deceleration condition, the engine may be started.

In a state that the SSC function is deactivated, the controller may determine whether a second ISG operation condition including a second reference vehicle speed that is lower than the first reference vehicle speed is satisfied based on the output signal of the vehicle operation status detector, and when the second ISG operation condition is satisfied, the controller may activate the ISG function.

The second ISG operation condition may be satisfied when it is determined that an accelerator pedal is not operated, a brake pedal is operated, a gear lever is in a traveling stage, a clutch pedal is in a fully depressed state, and a vehicle speed is lower than the second reference vehicle speed according to the output signal of the vehicle operation status detector.

When it is determined that the first ISG operation condition is not satisfied, the controller determines whether the SSC function deactivation condition may be satisfied, and when it is determined that the SSC function deactivation condition is satisfied, the controller may control the operation of the injector to inject fuel and control the electronic clutch to be engaged.

The SSC function deactivation condition may be satisfied when it is determined that an accelerator pedal is operated, a brake pedal is operated, a clutch pedal is operated, a gear lever is not in a traveling stage, or a vehicle speed corresponds to a predetermined SSC function deactivation vehicle speed according to the output signal of the vehicle operation status detector.

The operating motor may be a Mild Hybrid Starter Generator (MHSG).

The control method for the SSC function and the ISG function of the manual transmission vehicle and the vehicle to which the control method is applied according to an exemplary form of the present disclosure may relatively increase an engine stopping section, thereby improving fuel consumption of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
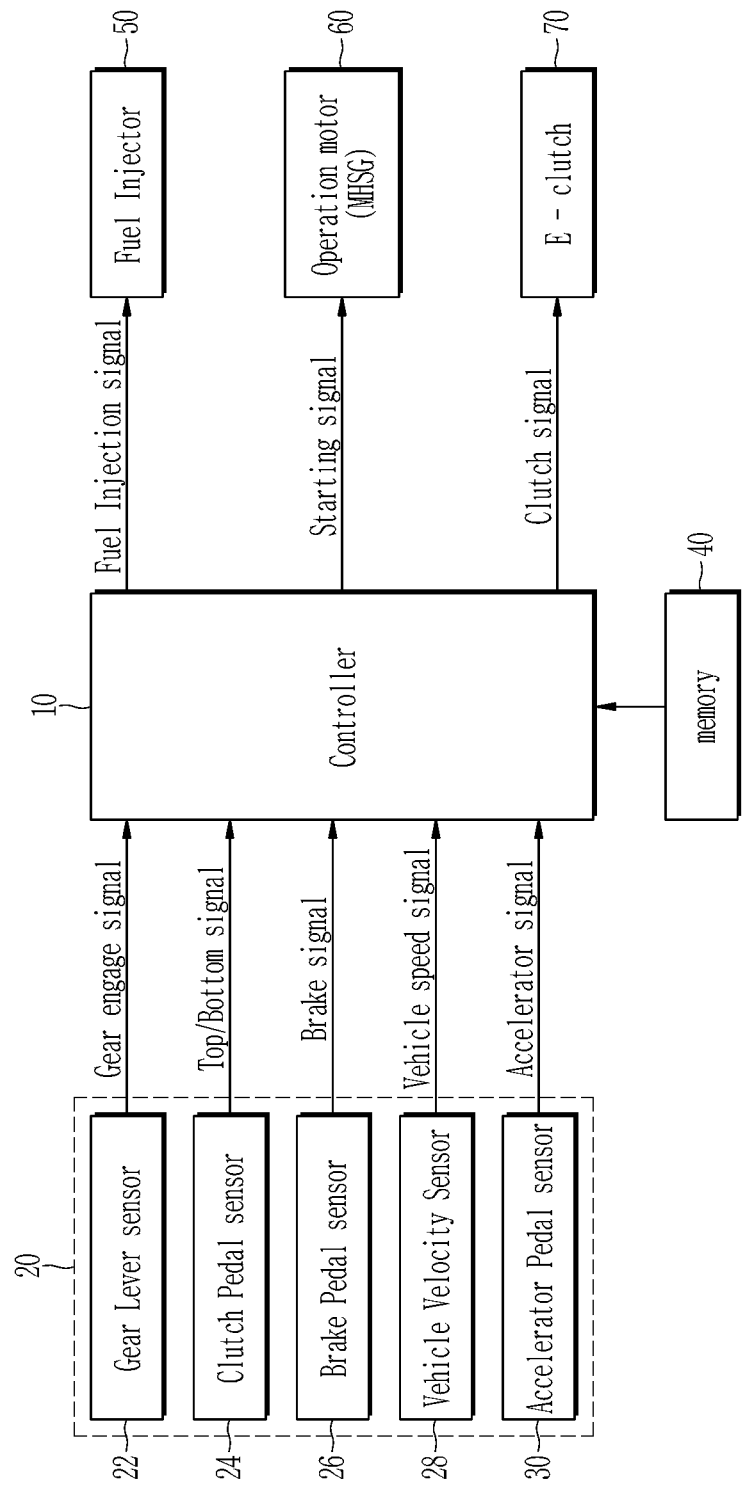
FIG. 1 is a block diagram of a manual transmission vehicle to which an SSC function and an ISG function are applied according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In order to better understand the present disclosure and the object achieved by the forms of the present disclosure, the accompanying drawings illustrating forms of the present disclosure and contents described in the accompanying drawings are to be referenced.

Hereinafter, the present disclosure will be described in detail by explaining an exemplary form of the present disclosure with reference to accompanying drawings. In describing the present disclosure, if it is determined that the detailed description of the related known configuration or function may obscure the gist of the present disclosure, the detailed description thereof will be omitted.

The terminology used herein is for the purpose of describing particular example forms only and is not intended to be limiting of the present disclosure. Singular expressions include a plurality of expressions unless the context clearly indicates otherwise. It should be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification, including technical and scientific terms, have the same meanings as those that are generally understood by those having ordinary skill in the art. It should be understood that the terms defined by a dictionary are identical with the meanings within the context of the related art. Such terms should not be ideally or excessively formally defined unless the context clearly dictates otherwise.

The constituent elements or "units", "blocks", or "modules" used in an exemplary form of the present disclosure are software such as tasks, classes, subroutines, processes, objects, threads of execution, and programs performed in a given area of memory. It may be implemented in hardware, such as software, field-programmable gate arrays (FPGAs), or application-specific integrated circuits (ASICs), or may be a combination of the software and hardware. The constituent elements or "-parts" may be included in a computer-readable storage medium, or a part of them may be distributed in a plurality of computers.

Figure 2:
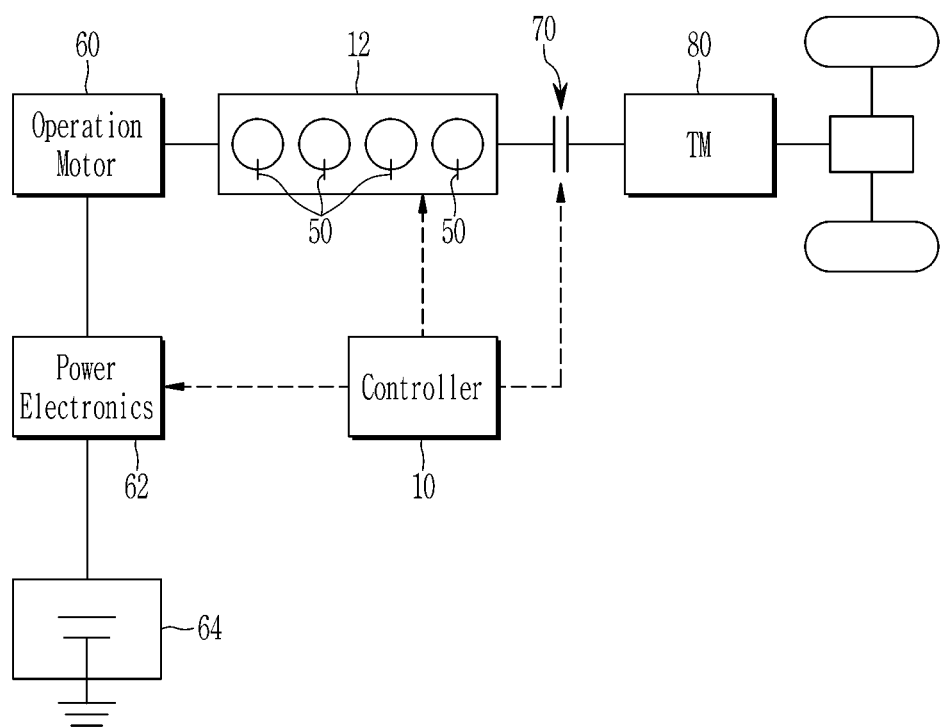
FIG. 2 is a view showing a manual transmission vehicle to which an SSC function and an ISG function are applied according to an exemplary form of the present disclosure.

FIG. 1 is a block diagram of a manual transmission vehicle to which an SSC function and an ISG function are applied according to an exemplary form of the present disclosure, and FIG. 2 is a view showing a manual transmission vehicle to which an SSC function and an ISG function are applied according to an exemplary form of the present disclosure.

Referring to FIG. 1 and FIG. 2, a manual transmission vehicle to which an SSC function and an ISG function are applied includes: a vehicle operation status detector 20, which measures various states of the vehicle and outputs corresponding signals; an injector 50 for injecting fuel into an engine 12; an operating motor 60 connected with the engine 12 for selectively starting the engine 12; an electronic clutch 70 for selectively connecting a transmission 80 and the engine 12 according to the output signal of the vehicle operation status detector 20; a controller 10 for controlling operations of the injector 50, the operating motor 60, and the electronic clutch 70 according to the output signal of the vehicle operation status detector 20; and a memory 40 that communicates with the controller 10. The transmission 80 may be a manual transmission.

The controller 10 may be, for example, a microprocessor (e.g., an ECU (Engine Control Unit or Electronic Control Unit) or hardware including at least one microprocessor operated by a program. Further, the program may include a series of instructions for performing a control method of a vehicle including an ISG function according to one form of the present disclosure. The program may be stored in the memory 40.

The vehicle operation status detector 20 includes: a clutch pedal sensor 24 for sensing operation of a clutch pedal and outputting a corresponding signals, a brake pedal sensor 26 for sensing operation of a brake pedal and outputting a corresponding signal, a gear lever sensor 22 for sensing operation of a gear lever and outputting a corresponding signal, a vehicle speed sensor 28 for sensing a vehicle speed and outputting a corresponding signal, and an accelerator pedal sensor 30 for sensing operation of an accelerator pedal and outputting a corresponding signal. The vehicle operation status detector 20 transmits vehicle running state information to the controller 10 and the vehicle running state information includes a clutch pedal signal, a brake pedal signal, a gear lever signal, a vehicle speed signal, and an accelerator pedal signal.

The clutch pedal sensor 24 may include one or more sensors that output a signal based on the operation state of the clutch pedal, such as when the clutch pedal is not depressed, the clutch pedal is depressed, and the clutch pedal is fully depressed.

The clutch pedal sensor 24 outputs a clutch engage signal when the clutch pedal is not depressed, outputs a top signal when the clutch is in the depressed state, and outputs a bottom signal when the clutch pedal is in the fully depressed state.

The Top signal may be defined as the driver stepping on the clutch pedal, and the Bottom signal may be defined as the signal generated when the driver fully depresses the clutch pedal.

The vehicle speed sensor 28 measures a current vehicle speed and outputs the corresponding signal, and the memory 40 records and stores the vehicle speed while driving (Velocity history).

The electronic clutch 70 selectively connects the engine 12 and the transmission 80, and the driver may disengage the electric clutch 70 by stepping on the clutch pedal and may also forcibly disengage the electronic clutch 70 by the control of the controller 10.

The vehicle to which the SSC function and the ISG function are applied according to an exemplary form of the present disclosure includes a motor controller 62 for controlling the operation of the operating motor 60, a battery 64, and the transmission 80. The transmission 80 may be a manual transmission.

The battery 64 may be a general 12 V battery, a 48 V battery or a 12 V battery for a mild hybrid, or a 48 V battery.

The operating motor 60 is connected with the engine 12 via a gear or belt, and may be a starter motor applied to a general engine, or an MHSG (Mild Hybrid Starter & Generator) which may start the engine 12, assist the engine 12, or convert rotational energy of the engine 12 into electrical energy.

That is, depending on the running state of the vehicle, the operating motor 60 may be operated in an engine starting mode as well as an engine torque auxiliary mode that operates as a motor to assist the torque of the engine 12. Also, the operating motor 60 may be operated in a mode that supplies power to the vehicle's electrical load and charges a 48 volt battery that charges a 12 volt battery connected to the 48 volt battery through a low voltage DC-DC converter (LDC), in a regenerative braking mode to charge the 48 volt battery, and in a coasting driving mode to extend travel distance. Thus, the operating motor 60 may be optimally controlled according to the running state of the vehicle to reduce or minimize the fuel consumption of the vehicle.

The motor controller 62 may be powered by the battery 64 as an inverter and/or converter to drive the operating motor 60 or transfer electricity generated from the operating motor 60 to the battery 64.

When the operating motor 60 is an MHSG driven at 48 V, a fuel cut-off area may be enlarged using a quick start response with the area.

Figure 3:
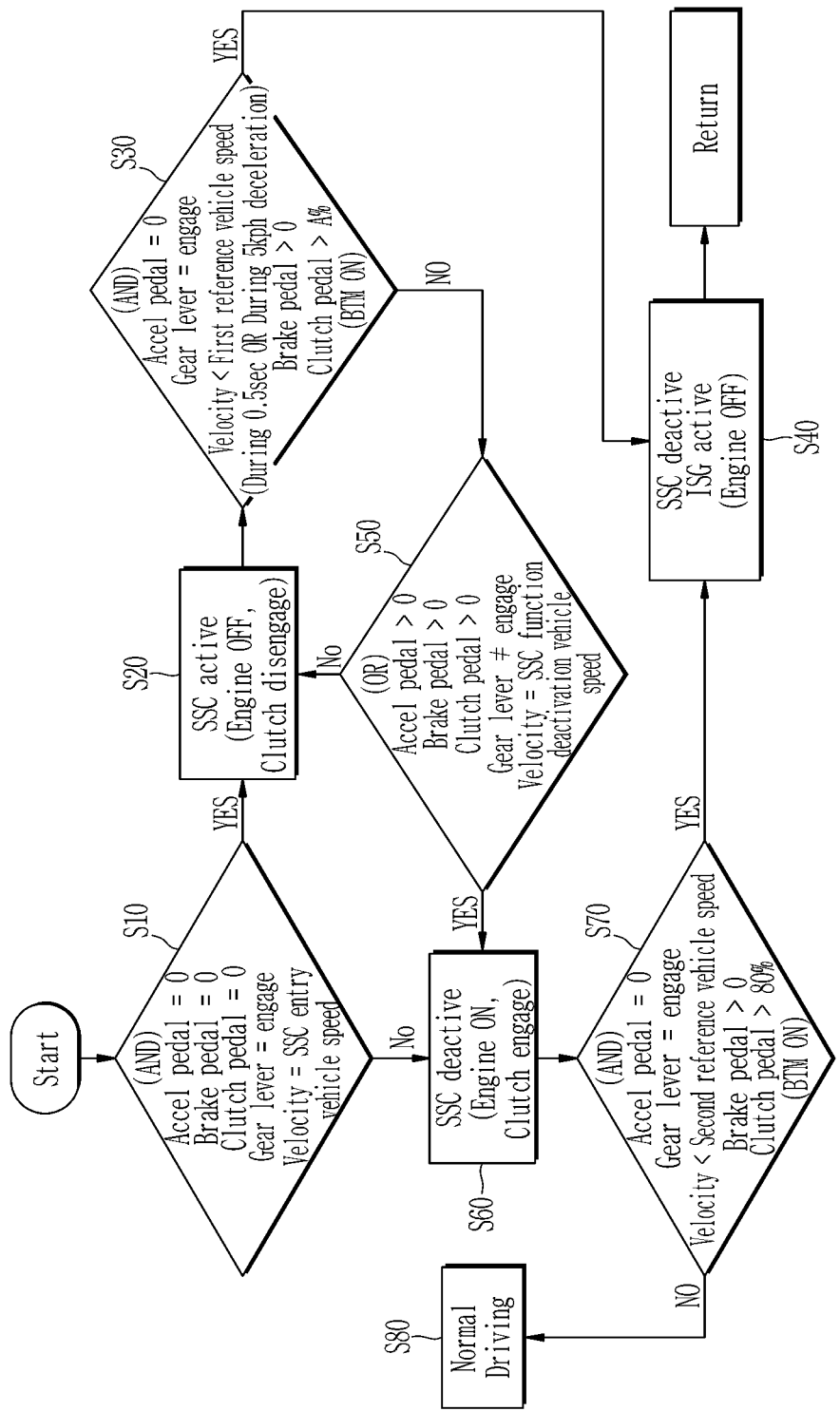
FIG. 3 is a flowchart showing a control method for an SSC function and an ISG function of a manual transmission vehicle according to an exemplary form of the present disclosure.

FIG. 3 is a flowchart showing a control method for an SSC function and an ISG function of a manual transmission vehicle according to an exemplary form of the present disclosure.

Next, the control method for the SSC function and the ISG function of the manual transmission vehicle according to an exemplary form of the present disclosure is described with reference to FIG. 1 to FIG. 3.

The control method for the SSC function and the ISG function according to an exemplary form of the present disclosure includes: a step (S10) for determining whether the controller 10 satisfies an SSC activation condition according to the output signal of the vehicle operation status detector 20, a step (S20) for stopping the engine 12 and disengaging the electronic clutch 70 to activate an SSC (Start Stop Coasting) function when it is determined that the controller 10 satisfies the SSC activation condition, a step (S30) for determining whether the controller 10 satisfies a first ISG operation condition including a first reference vehicle speed condition according to the vehicle running state information in the state that the SSC function is activated, and a step (S40) for deactivating the SSC function and activating the ISG function when the controller 10 satisfies the first ISG operation condition.

The SSC activation condition is satisfied when the controller 10 determines that the accelerator pedal is not operated, the brake pedal is not operated, the clutch pedal is not operated, a gear lever is in a traveling stage, and the vehicle speed is a predetermined SSC entry vehicle speed according to the output signal of the vehicle operation status detector 20 (S10), and the controller 10 stops the fuel injection and disengages the electronic clutch 70 by controlling the operation of the injector 50 to activate the SSC function (S20).

If the SSC function is activated, the fuel injection is stopped and the electronic clutch 70 is disengaged so that the SSC distance may be increased and the fuel consumption may be improved.

The SSC entry vehicle speed may be set differently according to the traveling stage of the gear lever. For example, as the gear lever is in a higher stage, the predetermined vehicle speed may be set as a higher speed, and it may be set as 25 ~120 kph, but it is not limited thereto.

The first ISG operation condition may be satisfied when it may be determined that the accelerator pedal is not operated, the brake pedal is not operated, the gear lever is in the traveling stage, the clutch pedal is in a fully depressed state, and the vehicle speed is lower than the first reference vehicle speed according to the vehicle running state information.

The fully depressed state of the clutch pedal, for example, may be a state that the Bottom signal is generated by depressing the clutch pedal by a predetermined range (A%), for example, 80% or more.

In the state that the SSC function is activated, if the driver operates the brake and fully depresses the clutch, it is determined that the intention of deceleration or stopping of the vehicle is determined, so the SSC function is deactivated and the ISG function is activated.

After the operation of the brake pedal or the full depression of the clutch pedal is generated, when the first ISG operation condition is not satisfied within a predetermined time or a predetermined deceleration, the engine may be started.

In this situation, the driver drives an analysis engine with the intention of driving the vehicle.

For example, when the operation of the brake pedal is detected within 0.5 seconds from the moment when the full depression of the clutch pedal occurs, or vice versa, it may be determined that the conditions of the clutch pedal and the brake pedal among the first ISG operating condition are satisfied.

Further, for example, only when the fully depression of the clutch pedal occurs before deceleration of 5 kph from the moment when the operation of the brake pedal is detected, or vice versa, it may be determined that the conditions of the clutch pedal and the brake pedal among the first ISG operating condition are satisfied.

That is, in the state that the SSC function is activated, the brake pedal and the clutch pedal are operated at about the same time, it is determined that there is a trend for the driver to decelerate or stop the vehicle, and the ISG function is activated.

Here, it is described that the predetermined time and the predetermined deceleration are 0.5 seconds and 5 kph as examples, but the present disclosure is not limited thereto, and they may be set in consideration of a driving environment, a driving habit of a driver, and the like.

Also, for example, if there is a gear shift within 0.5 seconds from the moment when the full depression of the clutch pedal occurs or before the deceleration of 5 kph, it is interpreted that the first ISG operating condition is not satisfied, that is, there is a trend that the driver is trying to drive the vehicle, thereby the engine is started.

Also, for example, even if an Off of the clutch pedal occurs within 0.5 seconds from the moment when the full depression of the clutch pedal occurs or before the deceleration of 5 kph, it is interpreted that the first ISG operating condition is not satisfied, that is, there is a trend that the driver is trying to drive the vehicle, thereby the engine is started.

When the first ISG operation condition is satisfied, the controller 10 maintains the stopping of the fuel injection, and in this case, the controller stops a disengage control of the electronic clutch 70, and the electronic clutch 70 operates according to the state that the driver depresses the clutch pedal (S40).

In addition, when an oscillation condition is satisfied in the state where the ISG function is activated, the driving is possible immediately, since the oscillation condition in the state where the ISG function is activated corresponds to a general ISG function, and a detailed description thereof is omitted.

The first reference vehicle speed may be set differently according to the traveling stage end of the gear lever.

When the gear lever is a higher stage, the first reference vehicle speed may be set as the higher speed, for example, 40 kph or less, but is not limited thereto.

The control method for the SSC function and the ISG function according to an exemplary form of the present disclosure may further include a step (S50) for determining whether an SSC function deactivation condition is satisfied when the controller does not satisfy the first ISG operation condition.

When it is determined that the accelerator pedal is operated, the brake pedal is operated, the clutch pedal is operated, the gear lever is not in the traveling stage, or the vehicle speed corresponds to a predetermined SSC function deactivation vehicle speed according to the vehicle running state information, the SSC function deactivation condition determines that the driver intends to drive the vehicle (S50), and deactivates the SSC function SSC (S60).

The meaning that the gear lever is not the traveling stage includes the meaning that the gear lever is the neutral stage.

As shown in FIG. 3, even if the SSC activation condition (S10) is not satisfied, the SSC function SSC is deactivated (S60), the engine 12 maintains the operation state or is converted into the operation state, and the electronic clutch 70 is maintained as the engaged state or is converted into the engaged state.

When the gear lever is in the higher stage, the first reference vehicle speed may be set as the higher speed, for example, 40 kph or less, but is not limited thereto.

The SSC function deactivation vehicle speed may be set, for example, as a case that the current vehicle speed is less than 15 kph or more than 120 kph, but is not limited thereto. The SSC function deactivation vehicle speed may also be set as a higher speed as the gear lever is in the higher stage.

The control method for the SSC function and the ISG function according to an exemplary form of the present disclosure further includes a step (S70) for determining whether the controller 10 satisfies a second ISG operation condition including a predetermined second reference vehicle speed condition that is lower than the first reference vehicle speed according to the vehicle running state information if the SSC activation condition (S10) is not satisfied, the first ISG operation condition (S30) is not satisfied, and the SSC function deactivation condition (S50) is not satisfied, that is, in the state that the SSC function is deactivated.

The second ISG operation condition may be satisfied when it is determined that the accelerator pedal is not operated, the brake pedal is operated, the gear lever is in the traveling stage, the clutch pedal is in the fully depressed state, and the vehicle speed is lower than the second reference vehicle speed according to the vehicle running state, and in this case, it is determined that the driver has the trend of deceleration or stop of the vehicle, and the ISG function is activated (S40).

The second reference vehicle speed may be set differently according to the traveling stage of the gear lever.

For example, as the gear lever is the higher stage, the second reference vehicle speed may be set as the higher speed, and may be set as 25 kph or less, but is not limited thereto.

When the second ISG operation condition is not satisfied, normal driving is performed (S80), and a process (S10) for again determining whether the SSC activation condition is satisfied may be repeated.

The control method for the SSC function and the ISG function according to an exemplary form of the present disclosure, in order to inhibit or prevent a frequent On/Off of the engine in the process of transitioning from the SSC driving to the ISG driving, raises an entry vehicle speed of the ISG that is transited into the ISG after entering the SSC.

That is, the first and second reference vehicle speeds may be distinguished, and the first reference vehicle speed which is transited to the ISG after entering the SSC may be set to be higher than the second reference vehicle speed, thereby reducing the on/off frequency of the engine.

FIG. 4 to FIG. 11 are graphs showing a control method for an SSC function and an ISG function of a manual transmission vehicle according to an exemplary form of the present disclosure.

Next, one example to which the control method for the SSC function and the ISG function of the manual transmission vehicle according to an exemplary form of the present disclosure is applied is described with reference to FIG. 4.

When it is determined that the accelerator pedal is not operated, the brake pedal is not operated, the clutch pedal is not operated, the gear lever is in the traveling stage, and the vehicle speed is the predetermined SSC entry vehicle speed according to the vehicle running state information (S10), the controller 10 activates the SSC function (S20).

That is, the controller 10 outputs an F/cut signal to the injector 50 and a disengage signal to the electronic clutch 70.

Then, the engine 12 is stopped, and the connection with the transmission 80 is disengaged so that the vehicle travels on the SSC.

When the clutch pedal is operated at the vehicle speed of greater than or equal to the first reference vehicle speed (No in S30 and Yes in S50), it is determined that the driver intends to drive the vehicle, and the SSC function is deactivated (S60).

That is, the injector 50 injects the fuel, and the forcible disengage control of the electric clutch 70 is stopped (Pedal input), but the clutch 70 is in a stepped state, so that the engine 12 and the transmission 80 maintain the state that the connection is disengaged.

Thereafter, if the second reference vehicle speed condition is satisfied and the brake pedal is operated, the ISG function is activated (S40).

Next, one example to which the control method for the SSC function and the ISG function of the manual transmission vehicle according to an exemplary form of the present disclosure is applied is described with reference to FIG. 5.

Figure 4:
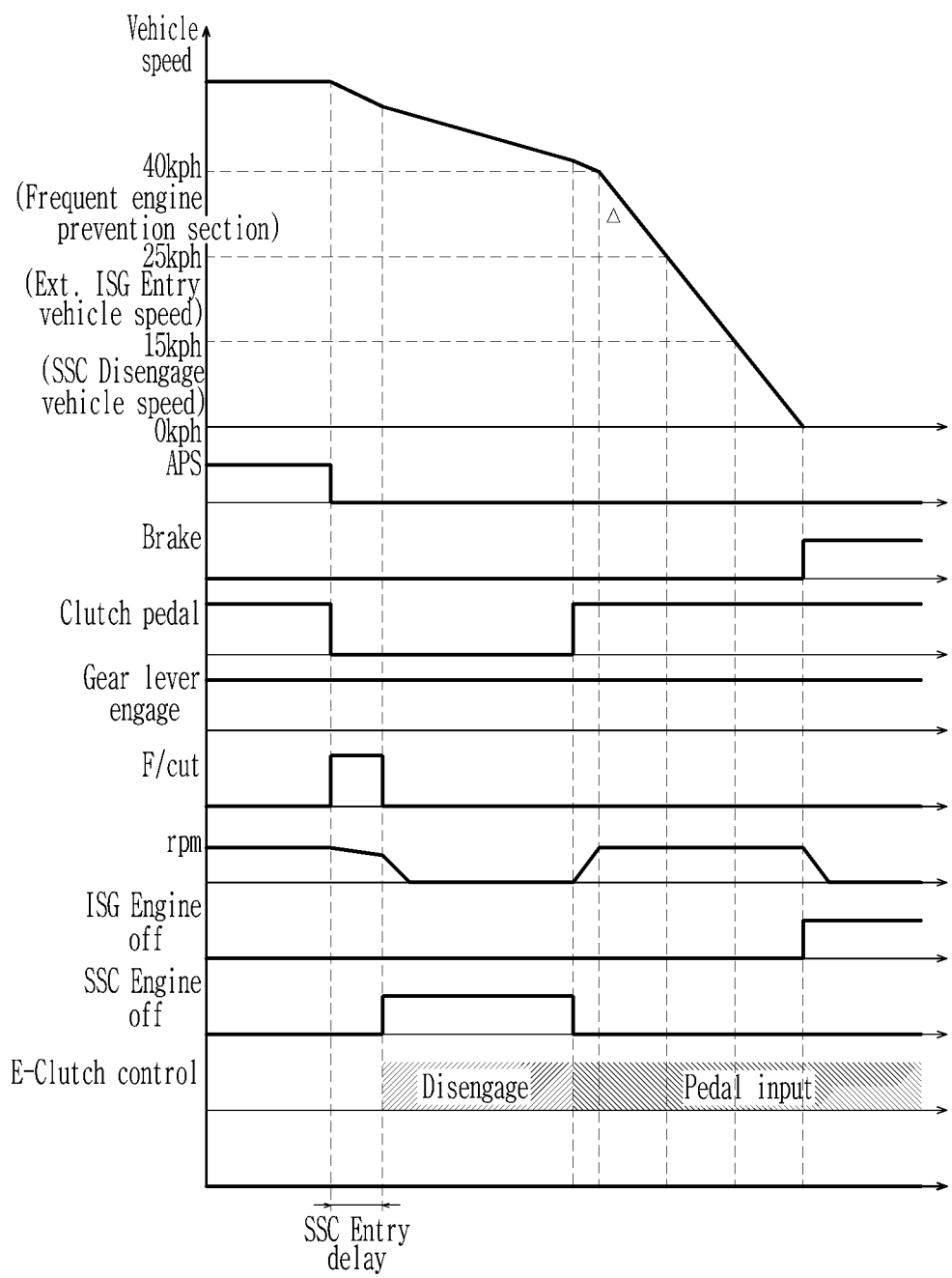
FIG. 4 to FIG. 11 are graphs respectively showing a control method for an SSC function and an ISG function of a manual transmission vehicle according to an exemplary form of the present disclosure.
Figure 5:
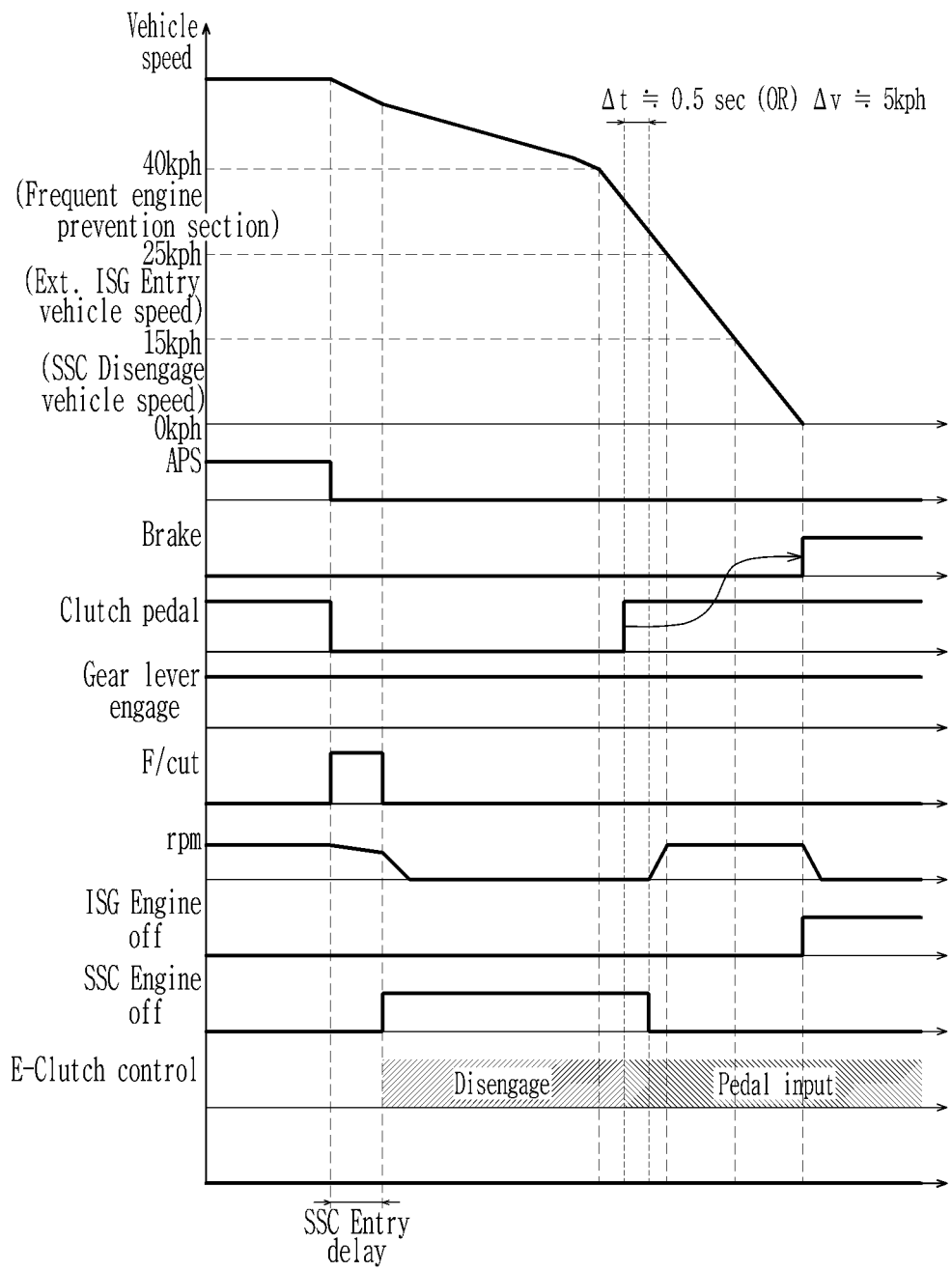

In describing the graph of FIG. 5, since the activation of the SSC function is the same as that of the graph of FIG. 4, repeated description thereof is omitted.

After the activation of the SSC function, if the clutch pedal is operated at a vehicle speed of less than the first reference vehicle speed, but the brake pedal is not operated (No in S30, Yes in S50) within a predetermined time or a predetermined deceleration, it is determined that the driver intends to drive the vehicle so that the SSC function is deactivated (S60).

That is, the injector 50 injects the fuel and the forcible disengage control of the electronic clutch 70 is stopped, but the state that the connection of the engine 12 and the transmission 80 is disengaged is maintained in the state that the clutch pedal is depressed.

Subsequently, if the second reference vehicle speed condition is satisfied and the brake pedal is operated (S70), the ISG function is activated (S40).

Next, one example to which the control method for the SSC function and the ISG function of the manual transmission vehicle according to an exemplary form of the present disclosure is applied is described with reference to FIG. 6.

Figure 6:
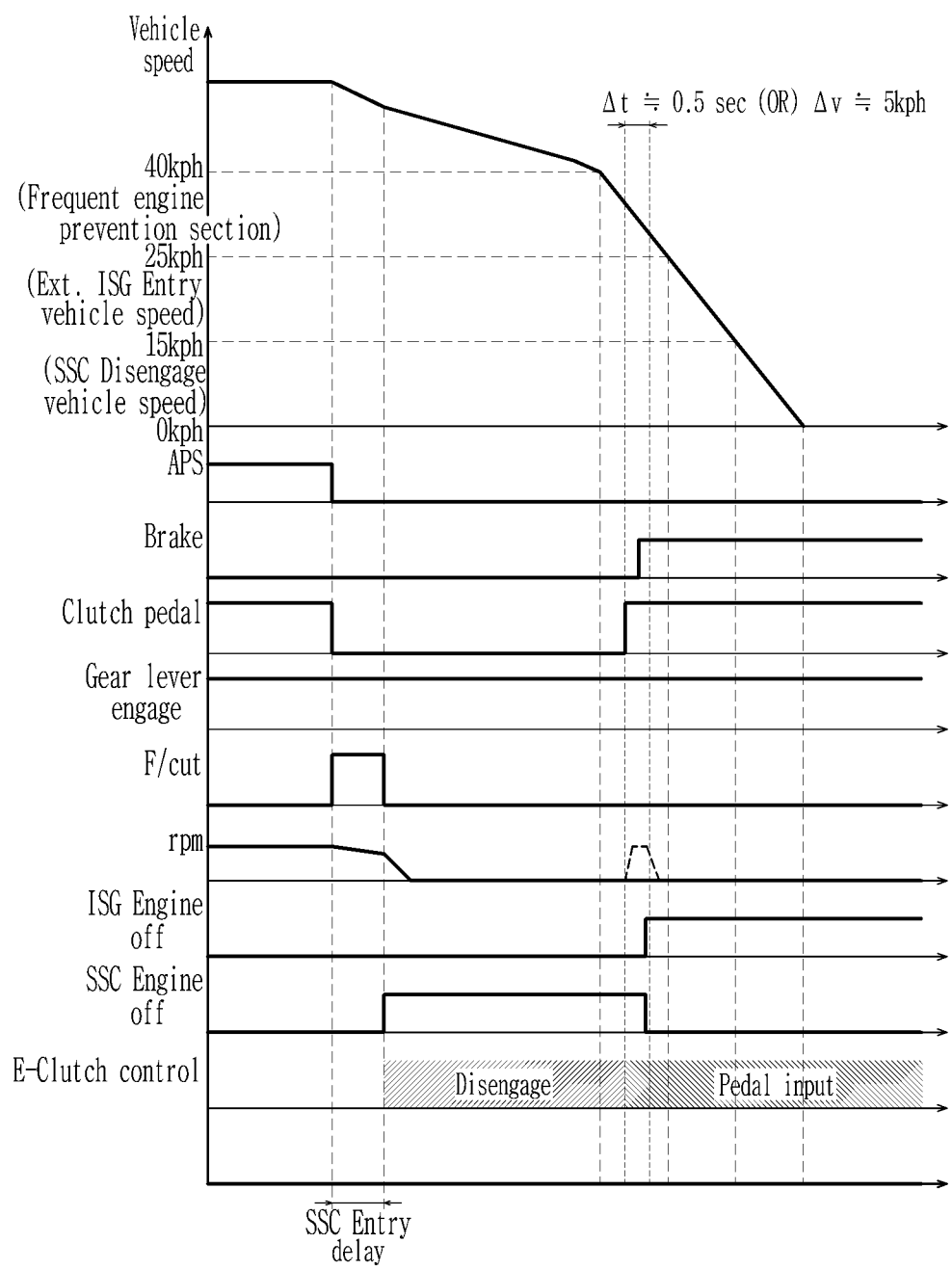

In describing the graph of FIG. 6, since the activation of the SSC function is the same as that of the graph of FIG. 4, repeated description thereof is omitted.

After the activation of the SSC function, if the clutch pedal is operated at a vehicle speed of less than the first reference vehicle speed and the brake pedal is operated (Yes in S30) within a predetermined time or a predetermined deceleration, it is determined that the driver intends to decelerate or stop the vehicle so that the SSC function is deactivated and the ISG function is activated (S40).

That is, the injector 50 does not inject the fuel and the forcible disengage control of the electronic clutch 70 is stopped, but the state that the connection of the engine 12 and the transmission 80 is disengaged is maintained in the state that the clutch pedal is depressed.

Next, one example to which the control method for the SSC function and the ISG function of the manual transmission vehicle according to an exemplary form of the present disclosure is applied is described with reference to FIG. 7.

Figure 7:
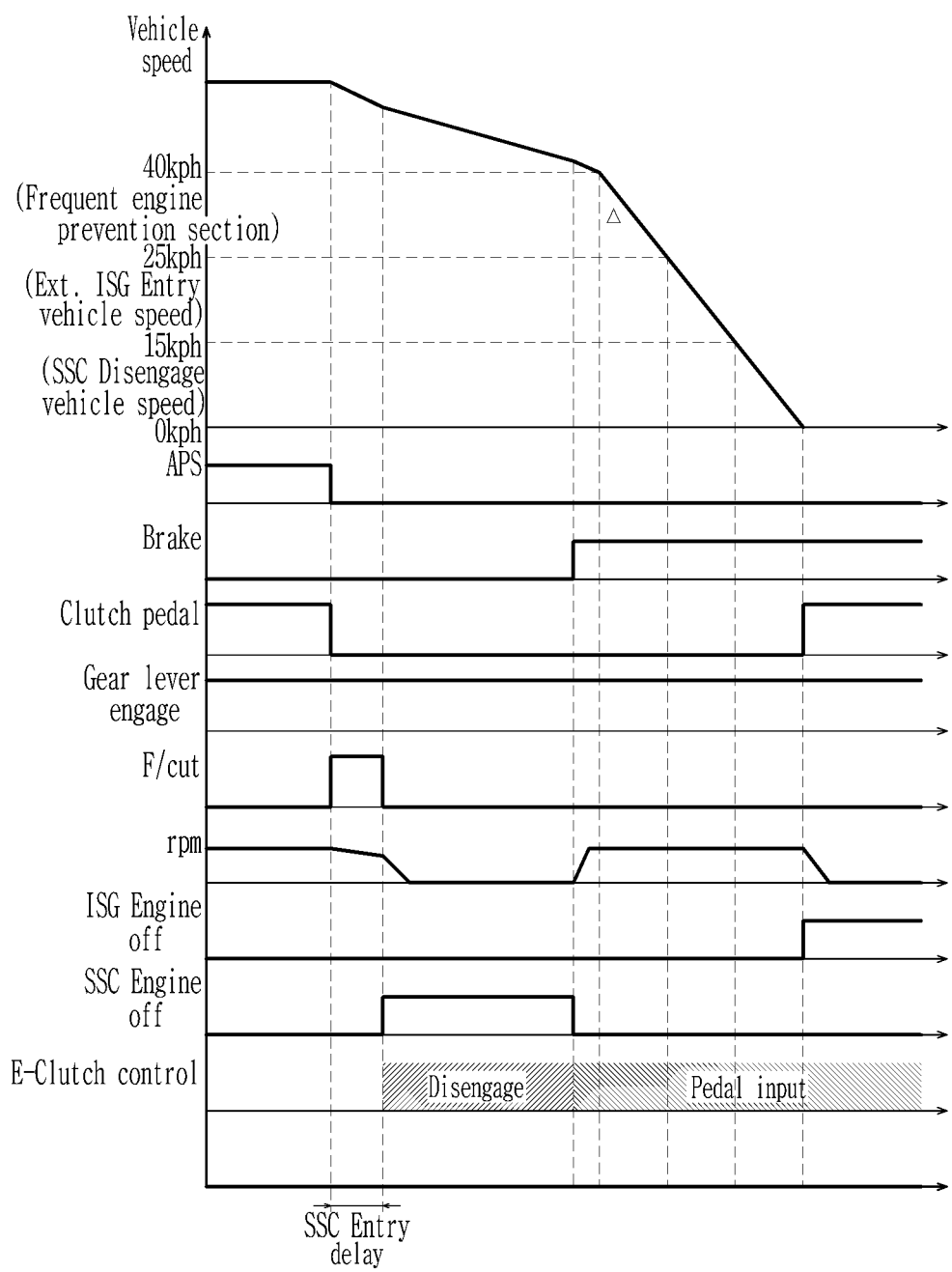

In describing the graph of FIG. 7, since the activation of the SSC function is the same as that of the graph of FIG. 4, repeated description thereof is omitted.

After the activation of the SSC function, if the brake pedal is operated at a vehicle speed of more than the first reference vehicle speed (No in S30, Yes in S50), it is determined that the driver intends to drive the vehicle so that the SSC function is deactivated (S60).

That is, the injector 50 injects the fuel and the forcible disengage control of the electronic clutch 70 is stopped (Pedal input).

Subsequently, if the second reference vehicle speed condition is satisfied and the clutch pedal is operated (S70), the ISG function is activated (S40).

Figure 8:
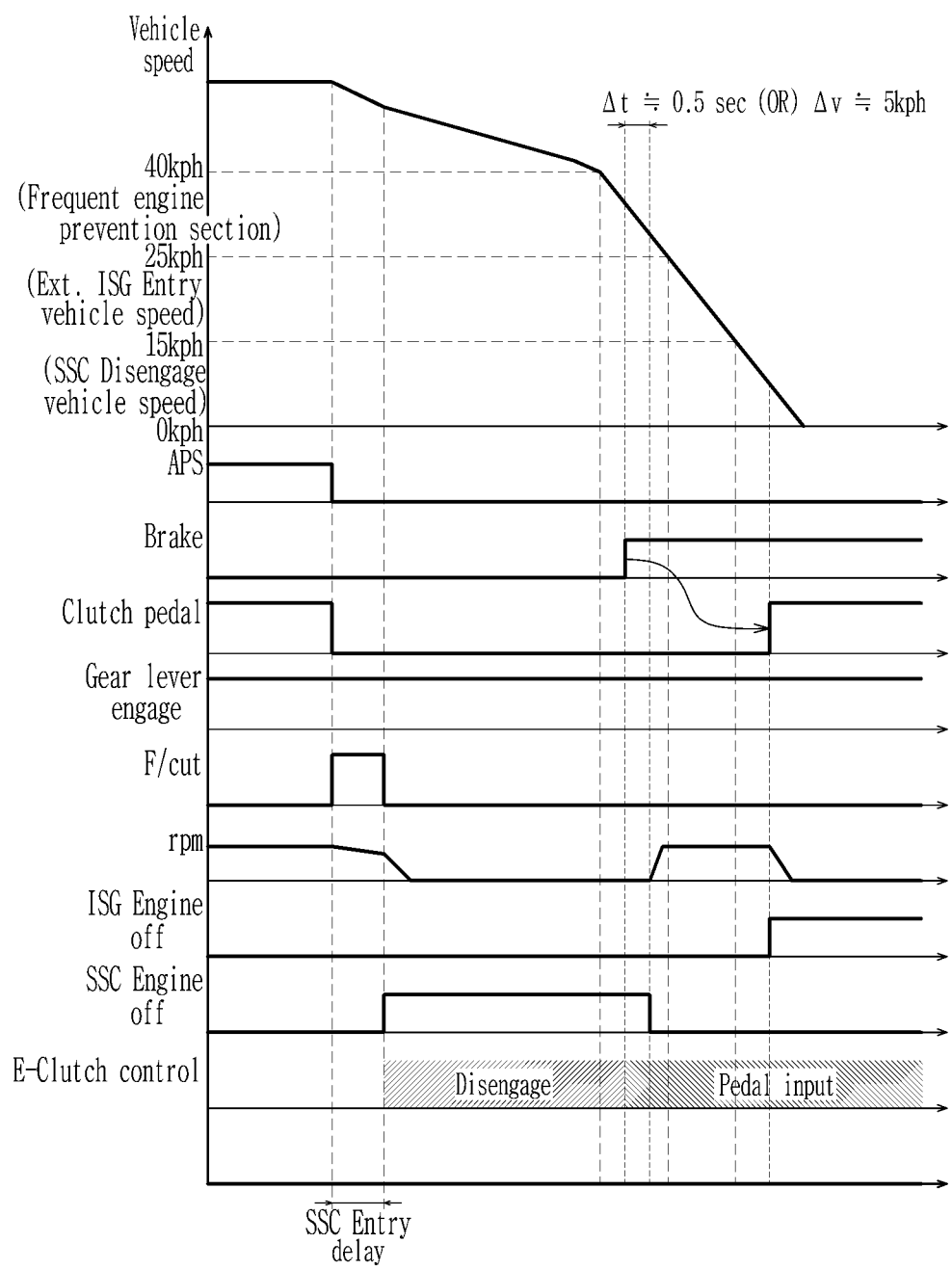

Next, one example to which the control method for the SSC function and the ISG function of the manual transmission vehicle according to an exemplary form of the present disclosure is applied is described with reference to FIG. 8.

In describing the graph of FIG. 6, since the activation of the SSC function is the same as that of the graph of FIG. 4, repeated description thereof is omitted.

After the activation of the SSC function, if the brake pedal is operated at a vehicle speed of less than the first reference vehicle speed, but the clutch pedal is not operated (No in S30, Yes in S50) within a predetermined time or a predetermined deceleration, it is determined that the driver intends to drive the vehicle so that the SSC function is deactivated (S60).

That is, the injector 50 injects the fuel, and the forcible disengage control of the electronic clutch 70 is stopped.

Subsequently, if the second reference vehicle speed condition is satisfied and the clutch pedal is operated (S70), the ISG function is activated (S40).

Next, one example to which the control method for the SSC function and the ISG function of the manual transmission vehicle according to an exemplary form of the present disclosure is applied is described with reference to FIG. 9.

Figure 9:
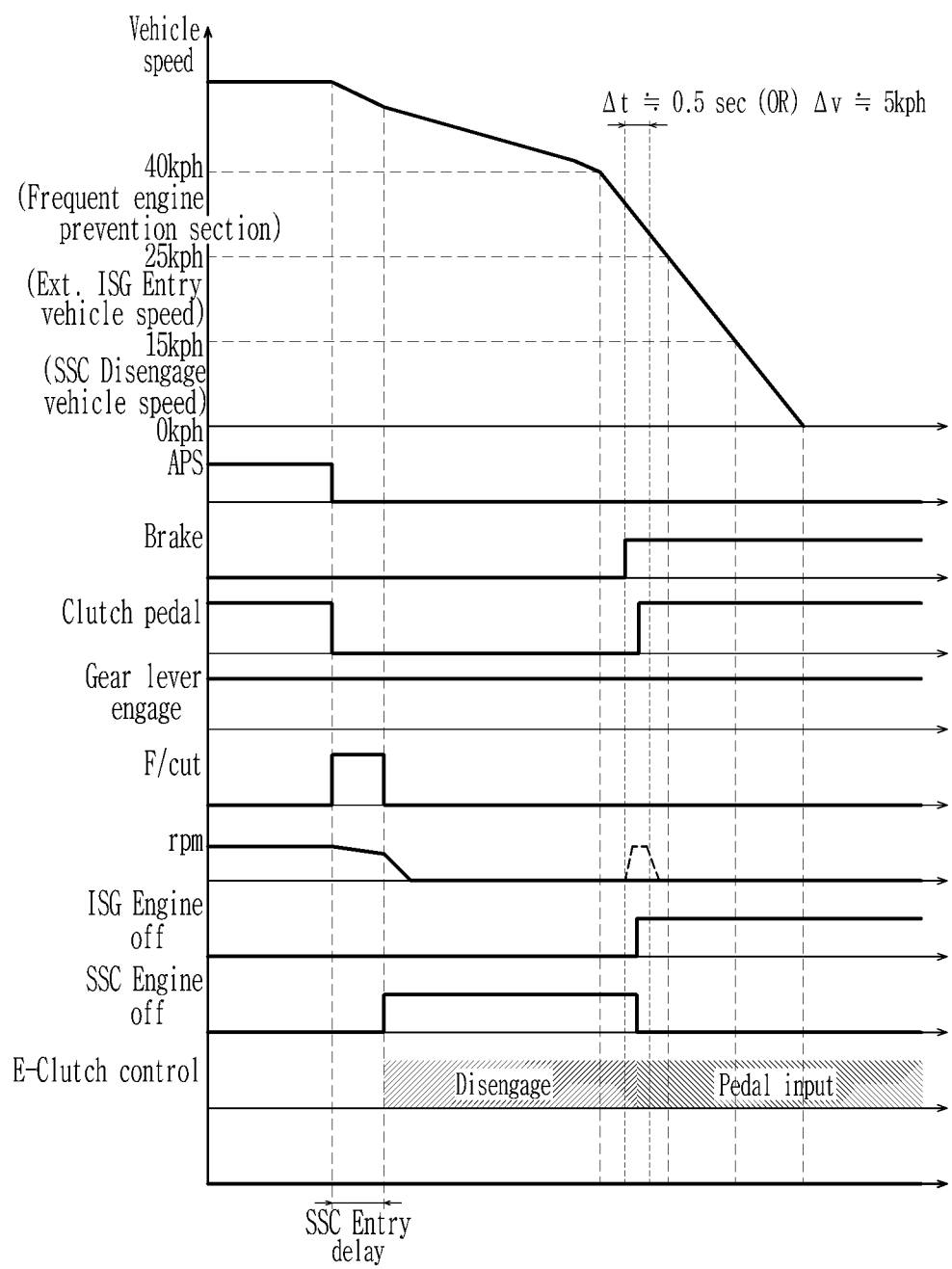

In describing the graph of FIG. 9, since the activation of the SSC function is the same as that of the graph of FIG. 4, repeated description thereof is omitted.

After the activation of the SSC function, if the brake pedal is operated at a vehicle speed of less than the first reference vehicle speed and the clutch pedal is operated (Yes in S30) within a predetermined time or a predetermined deceleration, it is determined that the driver intends to decelerate or stop the vehicle so that the ISG function is activated and the SSC function is deactivated (S40).

That is, the injector 50 maintains the injection stopping and the forcible disengage control of the electronic clutch 70 is stopped, but the state that the connection of the engine 12 and the transmission 80 is disengaged is maintained in the state that the clutch pedal is depressed.

Next, one example to which the control method for the SSC function and the ISG function of the manual transmission vehicle according to an exemplary form of the present disclosure is applied is described with reference to FIG. 10.

Figure 10:
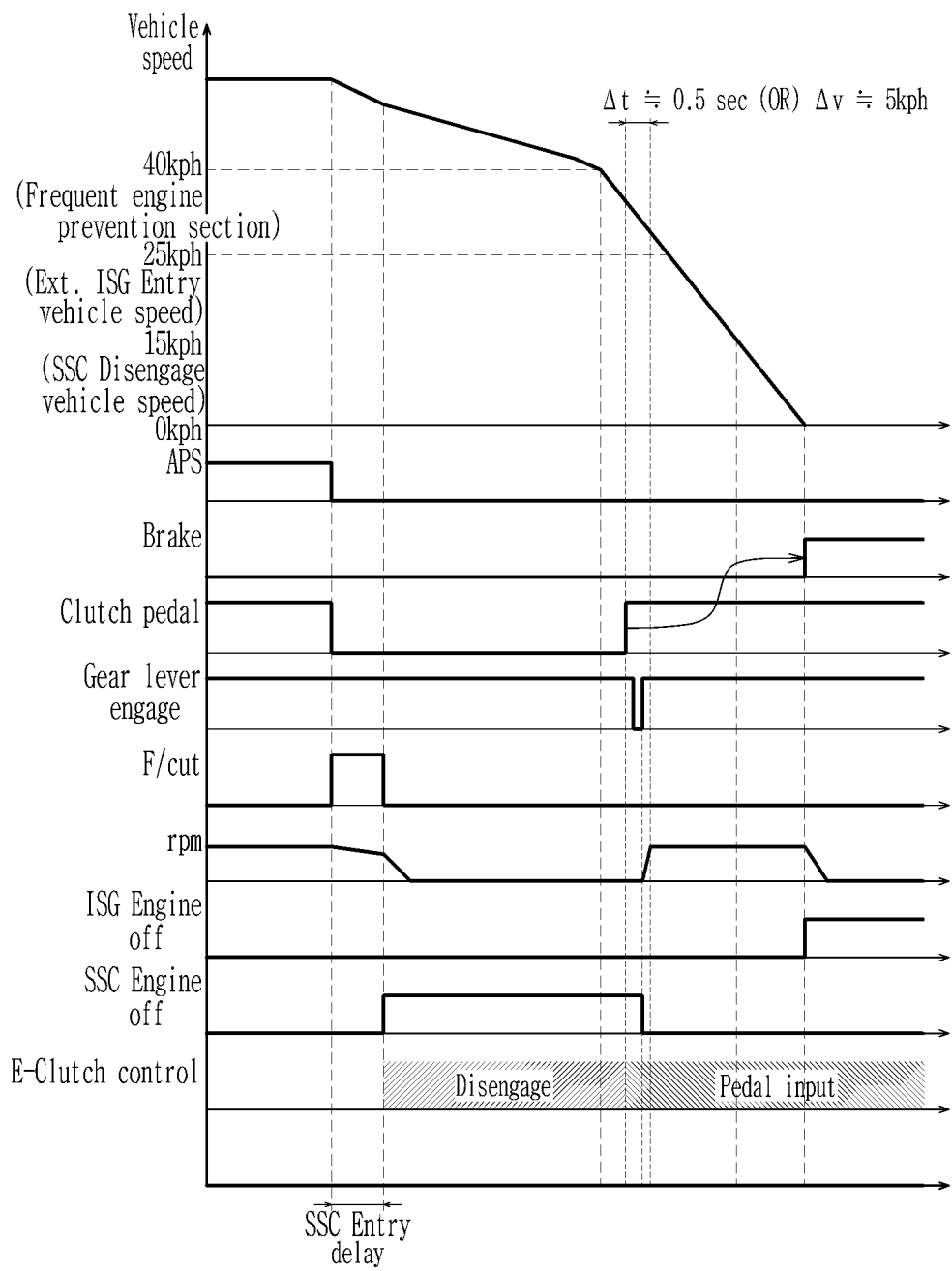

In describing the graph of FIG. 10, since the activation of the SSC function is the same as that of the graph of FIG. 4, repeated description thereof is omitted.

After the activation of the SSC function, if the clutch pedal is operated at a vehicle speed of less than the first reference vehicle speed and a shift signal of the gear lever is generated within a predetermined time or a predetermined deceleration (No in S30, Yes in S50), it is determined that the driver intends to drive the vehicle so that the engine is started and the forcible release control of the electronic clutch 70 is stopped.

Subsequently, if the second reference vehicle speed condition is satisfied and the clutch pedal is operated (S70), the ISG function is activated (S40).

Next, one example to which the control method for the SSC function and the ISG function of the manual transmission vehicle according to an exemplary form of the present disclosure is applied is described with reference to FIG. 11.

Figure 11:
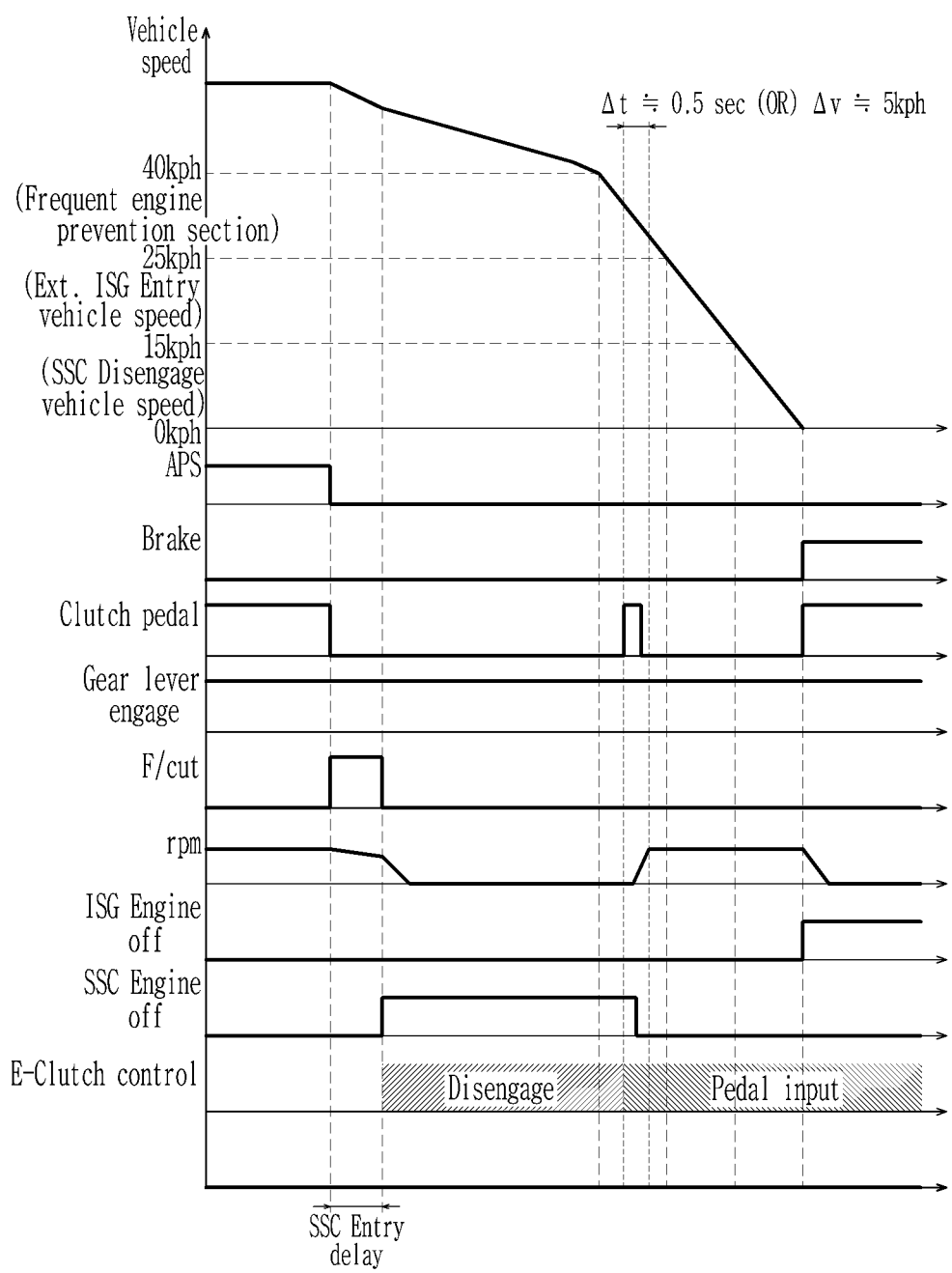

In describing the graph of FIG. 11, since the activation of the SSC function is the same as that of the graph of FIG. 4, repeated description thereof is omitted.

After the activation of the SSC function, if the clutch pedal is operated (depressed) at a vehicle speed of less than the first reference vehicle speed and the clutch pedal is disengaged (No in S30, Yes in S50) within a predetermined time or a predetermined deceleration, it is determined that the driver intends to drive the vehicle so that the engine is started and the forcible disengage control of the electronic clutch 70 is stopped.

Next, if the second reference vehicle speed condition is satisfied and the clutch pedal is operated (S70), the ISG function is activated (S40).

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

<Description of symbols>

| | |
|---|---|
| 10: controller | 12: engine |
| 20: vehicle operation status detector | 22: transmission sensor |
| 24: clutch pedal sensor | 26: brake pedal sensor |
| 28: vehicle speed sensor | 30: rpm sensor |
| 40: memory | 50: injector |
| 60: operation motor | 62: motor controller |
| 64: battery | 70: electronic clutch |
| 80: transmission | |

What is claimed is:

1. A control method for a Start Stop Coasting (SSC) function and an Idle Stop and Go (ISG) function of a vehicle having a manual transmission, the control method comprising:
   determining, by a controller, whether an SSC activation condition is satisfied based on vehicle running state information;
   stopping, by the controller, an engine and disengaging a clutch to activate the SSC function when the controller determines that the SSC activation condition is satisfied;
   determining, by the controller, whether a first ISG operation condition including a first reference vehicle speed is satisfied based on the vehicle running state information in a state that the SSC function is activated; and
   deactivating, by the controller, the SSC function and activating the ISG function when the controller determines that the first ISG operation condition is satisfied.

2. The control method of claim 1, wherein:
   the SSC activation condition is satisfied when an accelerator pedal is not operated, a brake pedal is not operated, a clutch pedal is not operated, a gear lever is in a traveling stage, and a vehicle speed is a predetermined SSC entry vehicle speed based on the vehicle running state information.

3. The control method of claim 2, wherein the predetermined SSC entry vehicle speed is set differently based on the traveling stage of the gear lever.

4. The control method of claim 1, wherein:
the first ISG operation condition is satisfied when an accelerator pedal is not operated, a brake pedal is operated, a gear lever is in a traveling stage, a clutch pedal is in a fully depressed state, and a vehicle speed is lower than the first reference vehicle speed based on the vehicle running state information.

5. The control method of claim 4, wherein:
after the brake pedal is operated or the clutch pedal is fully depressed, when the first ISG operation condition is not satisfied within a predetermined time or a predetermined deceleration condition, the engine is started.

6. The control method of claim 1, further comprising:
in a state that the SSC function is deactivated, determining, by the controller, whether a second ISG operation condition is satisfied, where the second ISG operation condition includes a second reference vehicle speed that is predetermined to be lower than the first reference vehicle speed based on the vehicle running state information.

7. The control method of claim 6, wherein:
the second ISG operation condition is satisfied when an accelerator pedal is not operated, a brake pedal is operated, a gear lever is in a traveling stage, a clutch pedal is in a fully depressed state, and a vehicle speed is lower than the second reference vehicle speed based on the vehicle running state information.

8. The control method of claim 7, wherein the first reference vehicle speed and the second reference vehicle speed are set differently based on the traveling stage of the gear lever.

9. The control method of claim 1, further comprising:
determining, by the controller, whether an SSC function deactivation condition is satisfied based on the vehicle running state information when the first ISG operation condition is not satisfied.

10. The control method of claim 9, wherein:
the SSC function deactivation condition is satisfied when an accelerator pedal is operated, a brake pedal is operated, a clutch pedal is operated, a gear lever is not in a traveling stage, or a vehicle speed corresponds to a predetermined SSC function deactivation vehicle speed based on the vehicle running state information.

11. A manual transmission vehicle implementing a control method for a Start Stop Coasting (SSC) function and an Idle Stop and Go (ISG) function, the manual transmission vehicle comprising:
a vehicle operation status detector including: an accelerator pedal sensor configured to sense an operation of an accelerator pedal and output a corresponding signal, a brake pedal sensor configured to sense an operation of a brake pedal and output a corresponding signal, a clutch pedal sensor configured to sense an operation of a clutch pedal and output a corresponding signal, a gear lever sensor configured to sense an operation of a gear lever and output a corresponding signal, and a vehicle speed sensor configured to sense a vehicle speed and output a corresponding signal;
an injector configured to inject fuel to an engine;
an operating motor connected to the engine and configured to selectively start the engine;
an electronic clutch configured to selectively connect a manual transmission and the engine;
a controller configured to control the injector, the operating motor, and the electronic clutch based on an output signal from the vehicle operation status detector; and
a memory electrically connected with the controller,
wherein the controller is configured to:
determine whether an SSC activation condition is satisfied based on the output signal from the vehicle operation status detector, and
when the SSC activation condition is satisfied, control the injector to stop fuel injection and disengage the electronic clutch to activate the SSC function,
in a state that the SSC function is activated, determine whether a first ISG operation condition including a first reference vehicle speed is satisfied based on the vehicle running state information, and
when the first ISG operation condition is satisfied, deactivate the SSC function and activate the ISG function.

12. The manual transmission vehicle of claim 11, wherein:
the SSC activation condition is satisfied when the accelerator pedal is not operated, the brake pedal is not operated, the clutch pedal is not operated, the gear lever is in a traveling stage, and the vehicle speed is a predetermined SSC entry vehicle speed based on the output signal from the vehicle operation status detector.

13. The manual transmission vehicle of claim 11, wherein:
the first ISG operation condition is satisfied when the accelerator pedal is not operated, the brake pedal is operated, the gear lever is in a traveling stage, the clutch pedal is in a fully depressed state, and the vehicle speed is lower than the first reference vehicle speed based on the output signal of the vehicle operation status detector.

14. The manual transmission vehicle of claim 11, wherein:
after the operation of the brake pedal or the clutch pedal is fully depressed, and when the first ISG operation condition is not satisfied within a predetermined time or a predetermined deceleration condition, the engine is started.

15. The manual transmission vehicle of claim 11, wherein:
in a state that the SSC function is deactivated, the controller is configured to determine whether a second ISG operation condition including a second reference vehicle speed that is lower than the first reference vehicle speed is satisfied based on the output signal from the vehicle operation status detector, and
when the second ISG operation condition is satisfied, the controller is configured to activate the ISG function.

16. The manual transmission vehicle of claim 15, wherein:
the second ISG operation condition is satisfied when the accelerator pedal is not operated, the brake pedal is operated, the gear lever is in a traveling stage, the clutch pedal is in a fully depressed state, and the vehicle speed is lower than the second reference vehicle speed based on the output signal from the vehicle operation status detector.

17. The manual transmission vehicle of claim 11, wherein:

when the first ISG operation condition is not satisfied, the controller is configured to determine whether a SSC function deactivation condition is satisfied, and when the SSC function deactivation condition is satisfied, the controller is configured to control the operation of the injector to inject fuel and control the electronic clutch to be engaged.

18. The manual transmission vehicle of claim 17, wherein:

the SSC function deactivation condition is satisfied when the accelerator pedal is operated, the brake pedal is operated, the clutch pedal is operated, the gear lever is not in a traveling stage, or the vehicle speed corresponds to a predetermined SSC function deactivation vehicle speed based on the output signal from the vehicle operation status detector.

19. The manual transmission vehicle of claim 11, wherein the operating motor is a Mild Hybrid Starter Generator (MHSG).

* * * * *